United States Patent [19]
Obara

[11] Patent Number: 5,655,846
[45] Date of Patent: Aug. 12, 1997

[54] BEARING ASSEMBLY AND METHOD OF MANUFACTURING THE SAME

[75] Inventor: Rikuro Obara, Nagano-ken, Japan

[73] Assignee: Minebea Kabushiki-Kaisha, Nagano-ken, Japan

[21] Appl. No.: 675,758

[22] Filed: Jul. 3, 1996

[30] Foreign Application Priority Data

Jul. 7, 1995 [JP] Japan ..................... 7-196141

[51] Int. Cl.⁶ ............... F16C 33/60; B23P 15/00
[52] U.S. Cl. .................. 384/520; 384/504; 384/510; 29/898.09
[58] Field of Search ................... 384/499, 504, 384/506, 510, 512, 517, 520; 29/898.06, 898.07, 898.09

[56] References Cited

U.S. PATENT DOCUMENTS

| | | | |
|---|---|---|---|
| 2,825,200 | 3/1958 | Boullion | 384/520 X |
| 5,106,210 | 4/1992 | Chi | 384/510 X |
| 5,509,198 | 4/1996 | Takamizawa et al. | 29/898.09 |
| 5,556,209 | 9/1996 | Obara et al. | 384/504 |

*Primary Examiner*—Thomas R. Hannon
*Attorney, Agent, or Firm*—Lowe, Price, LeBlanc & Becker

[57] ABSTRACT

A bearing assembly, and method of assembling same, including a stepped-diameter shaft, a first outer race ring being disposed around a raceway groove directly formed in the large diameter portion, a second bearing outer race and an inner race ring mounted on the small diameter portion of the shaft, and a sleeve-like spacer provided with a pair of small diameter portions in its opposite axial end portions each fitted into in the respective first and second outer races.

4 Claims, 1 Drawing Sheet

BEARING ASSEMBLY AND METHOD OF MANUFACTURING THE SAME

BACKGROUND OF THE INVENTION

1. Field of the Invention

The present invention relates to a bearing assembly and a method of manufacturing the same, the bearing assembly being used in rotating portions of a computer and its peripheral devices.

2. Description of the Prior Art

As for a conventional bearing assembly constructed of a pair of ball bearing units A, B mounted on a rotary shaft D of rotating portions of a computer or its peripheral devices, as is clear from FIG. 2(a), it is necessary to produce its components separately. Consequently, a sleeve-like spacer C and such pair of the ball bearing units A, B are produced separately from each other. These components A, B, C of the conventional bearing assembly are then delivered to a user. After receipt of the components, the user mounts the components A, B, C on the rotary shaft D to complete the conventional bearing assembly, as shown in FIG. 2(b).

As described above, in the conventional bearing assembly, it is necessary for the user to mount the pair of the ball bearing units A, B and the spacer C on the rotary shaft D in a condition in which the ball bearing units A, B are spaced apart from each other through the spacer C. Consequently, the conventional bearing assembly suffers from the following problems:

(a) While keeping a sufficient rigidity, the rotary shaft D is required to be sized in outer diameter so as to engage with the inner race rings of the ball bearing units A, B;

(b) Since the spacer C is a separate component independent of the pair of the ball bearing units A and B, it is necessary for the spacer C to have its opposite end surfaces improved in parallelism therebetween and also in flatness thereof, taken in connection with the dimensions of the ball bearing units A, B being assembled together with the spacer C; and (c) Since the spacer C is merely sandwiched between a pair of outer race rings of the ball bearing units A and B, it is necessary for the user to have the spacer C coaxially mounted on the rotary shaft D with high accuracy.

SUMMARY OF THE INVENTION

It is an object of the present invention to solve the above problems by providing a bearing assembly and a method of manufacturing the same, the bearing assembly being easily mounted in rotating portions of a computer and its peripheral devices at the user's end.

According to a first aspect of the present invention, the above object of the present invention is accomplished by providing:

A bearing assembly comprising:

a stepped-diameter shaft provided with a large-diameter portion, a small-diameter portion and an annular inner raceway groove directly formed in an outer peripheral surface of the large-diameter portion;

a first outer race ring coaxially disposed around the large-diameter portion of the stepped-diameter shaft and spaced apart therefrom to form an annular space therebetween, the first outer race ring having its inner peripheral surface formed into an outer raceway groove;

a plurality of first balls rotatably mounted in the annular space defined between the annular inner raceway groove of the stepped-diameter shaft and the annular outer raceway groove of the first outer race ring; and a sleeve-like spacer which is provided with a pair of small-diameter portions in its opposite axial end portions and has one of its small-diameter portions fitted in the first outer race ring and the other fitted in a second outer race of a ball bearing unit which has its inner race ring mounted on the small-diameter portion of the stepped-diameter shaft, the sleeve-like spacer being coaxially disposed around the stepped-diameter shaft while spaced apart therefrom and axially extending between the first outer race and the second outer race of the ball bearing unit which is provided with a plurality of second balls between the inner race ring and the second outer race ring;

whereby the first outer race ring, the sleeve-like spacer, the plurality of first balls, the ball bearing unit and the stepped-diameter shaft are assembled into a bearing assembly.

According to a second aspect of the present invention, the above object of the present invention is accomplished by providing:

The bearing assembly as set forth in the first aspect of the present invention, wherein:

an outer diameter of the inner race ring of the ball bearing unit is the same as that of the large-diameter portion of the stepped-diameter shaft; and an outer and an inner diameter of the second outer race ring of the ball bearing unit are the same as those of the first outer race ring, respectively;

whereby the first and the second balls are the same in diameter.

According to a third aspect of the present invention, the above object of the present invention is accomplished by providing:

The bearing assembly as set forth in the second aspect of the present invention, wherein:

the bearing assembly further comprises a ball retainer coaxially and rotatably mounted in the annular space to rotatably retain the first balls therein.

According to a fourth aspect of the present invention, the above object of the present invention is accomplished by providing:

A method of manufacturing a bearing assembly, comprising the steps of:

forming an annular inner raceway groove directly in an outer peripheral surface of a large-diameter portion of a stepped-diameter shaft provided with a small-diameter portion;

mounting a plurality of first balls in an annular space defined between the annular inner raceway groove of the stepped-diameter shaft and an annular outer raceway groove formed in an inner peripheral surface of a first outer race ring which is coaxially disposed around the large-diameter portion of the stepped-diameter shaft so as to be oppositely disposed from the annular inner raceway groove of the stepped-diameter shaft;

coaxially mounting a sleeve-like spacer around the stepped-diameter shaft so as to be spaced apart therefrom, the spacer being provided with a pair of small-diameter portions in its axial end portions and having one of its small-diameter portions coaxially fitted in the first outer race ring;

slidably mounting the other of the small-diameter portions of the spacer in a second outer race ring of a ball bearing unit provided with a plurality of second balls and an inner race ring, the ball bearing unit having its inner race ring slidably mounted on the small-diameter portion of the stepped-diameter shaft; and bonding the inner race ring of the ball bearing unit to the small-diameter portion of the stepped-diameter shaft by means of an adhesive and like connecting means in a condition in which a predetermined axially inward pre-load is applied to an outer end surface of the inner race ring or the second outer race ring of the ball bearing unit;

whereby the first outer race ring, the sleeve-like spacer, the plurality of first balls, the ball bearing unit and the stepped-diameter shaft are assembled into a bearing assembly.

DESCRIPTION OF THE PREFERRED EMBODIMENTS

Hereinbelow, the present invention will be described in detail with reference to the accompanying drawings.

Figure 1:
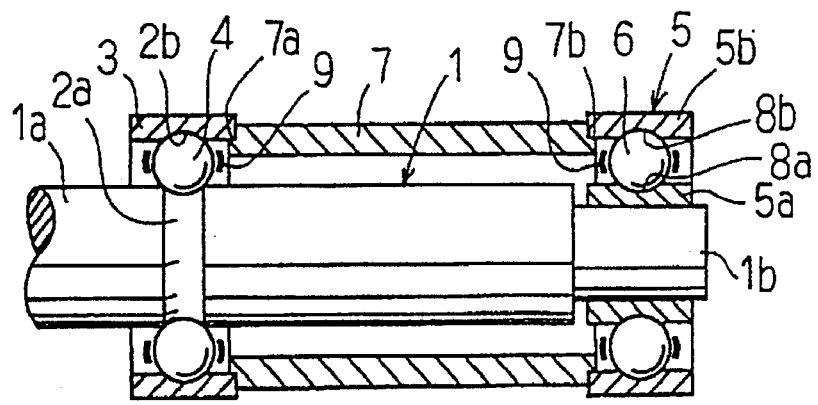
FIG. 1 is a longitudinal sectional view of an embodiment of the bearing assembly of the present invention.
Figure 2A:
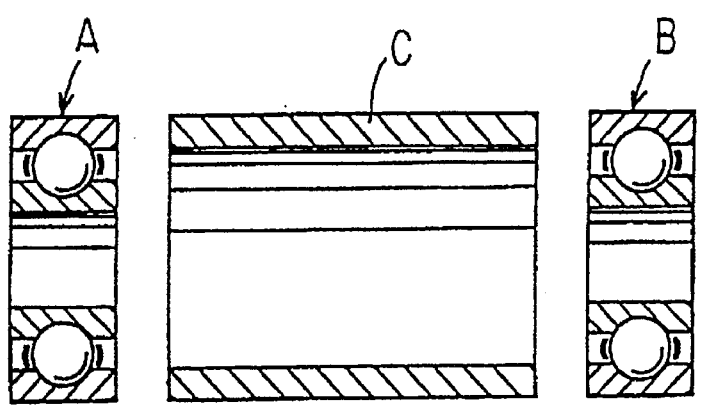
FIG. 2(a) is a longitudinal sectional view of a conventional bearing assembly, illustrating each of its components, i.e., a pair of ball bearing units and a spacer, from which the bearing assembly is assembled.
Figure 2B:
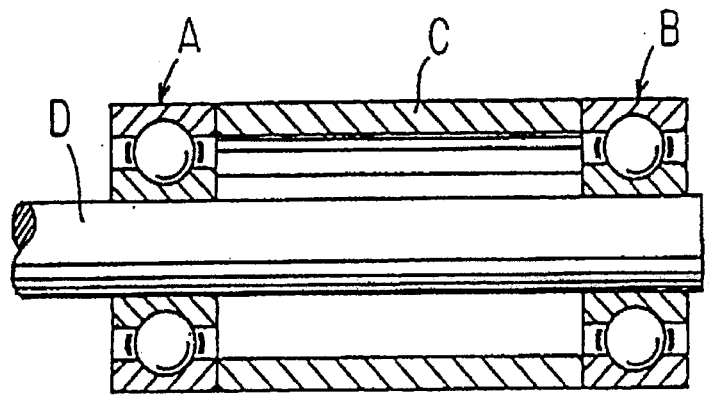
FIG. 2(b) is a longitudinal sectional view of the conventional bearing assembly after completion of assembling operation thereof, illustrating both the ball bearing units and the spacer having been properly mounted on a shaft.

FIG. 1 shows an embodiment of a bearing assembly of the present invention.

As shown in FIG. 1, a a stepped-diameter shaft 1 is provided with a large-diameter portion 1a and a small-diameter portion 1b. Formed in an outer peripheral surface of the large-diameter portion 1a of the shaft 1 is an annular inner raceway groove 2a directly.

An outer race ring 3 is oppositely disposed from the inner raceway groove 2a of the large-diameter portion 1a of the shaft 1, and provided with an annular outer raceway groove 2b in its inner peripheral surface, so that a plurality of balls 4 are rotatably mounted between the inner raceway groove 2a of the shaft 1 and the outer raceway groove 2b of the outer race ring 3.

A ball bearing unit 5, which is constructed of an inner race ring 5a, an outer race ring 5b and a plurality of balls 6 rotatably mounted between these race rings 5a and 5b, has the inner race ring 5a fixedly mounted on the small-diameter portion 1b of the shaft 1 in an insertion manner.

A sleeve-like spacer 7 is coaxially arranged with the shaft 1 so as to cover the shaft 1, and is provided with a pair of small-diameter portions 7a, 7b in its axially opposite end portions. An outer diameter of each of the small-diameter portions 7a, 7b of the spacer 7 is so determined as to permits these small-diameter portions 7a and 7b to properly fit in the outer race rings 3 and 5b, respectively.

On the other hand, an outer diameter of the inner race ring 5a of the ball bearing unit 5 is equal to an outer diameter of the large-diameter portion 1a of the stepped-diameter shaft 1. Further, there is no difference in both outer and inner diameter between the outer race ring 5b of the ball bearing unit 5 and the outer race ring 3 of the large-diameter portion 1a of the shaft 1, so that the balls 4, 6 are the same in diameter.

Incidentally, the balls 4, 6 are rotatably supported in ball retainers 9, and travel in the annular inner and outer raceway grooves 2a, 2b, 8a and 8b of the bearing assembly of the present invention.

In this embodiment of the bearing assembly of the present invention, the inner race ring 5a of the ball bearing unit 5 is slidably mounted on the small-diameter portion 1b of the stepped-diameter shaft 1 in an insertion manner, and has its outer end surface (i.e., right-hand side as viewed in FIG. 1) subjected to a predetermined axially inward pre-load. Under such circumstances, the inner race ring 5a of the ball bearing unit 5 is bonded to the small-diameter portion 1b of the stepped-diameter shaft 1 by means of a suitable adhesive and like connecting means. Thus the components such as the spacer 7, the outer race ring 3, and the ball bearing unit 5 are successively mounted on the shaft 1 to complete the bearing assembly of the present invention.

Although the balls 4, 6 are the same in diameter in the above embodiment of the present invention, it is also possible to use any other balls which are different in diameter from the balls 4, 6. In other words, the balls used in the small-diameter portion 1b of the shaft 1 may be different in diameter from those used in the large-diameter portion 1a of the shaft 1.

The bearing assembly of the present invention having the above construction has the following actions and effects:

(1) Since the outer race ring 3, balls 4, spacer 7, ball bearing unit 5 and the stepped-diameter shaft 1 are assembled into the bearing assembly of the present invention, the user is released from a cumbersome assembling work of the bearing assembly, the assembly being easily mounted inside a sleeve-like rotating element by inserting the assembly into the rotating element and fixing the assembly therein;

(2) Since the bearing assembly of the present invention uses the stepped-diameter shaft 1 provided with the large-diameter portion 1a having its outer peripheral surface formed into the annular inner raceway groove 2a, it is possible for the bearing assembly of the present invention to eliminate the conventional type inner race ring in the large-diameter portion 1a of the stepped-diameter shaft 1, which permits the shaft 1 to be partially improved in rigidity;

(3) Since the stepped-diameter shaft 1 is provided with the large-diameter portion 1a and therefore improved in rigidity, it is possible to increase the resonance point of a spindle motor which is provided with the bearing assembly of the present invention and used in the office automation instruments and like systems, so that the spindle motor provided with the bearing assembly of the present invention may be prevented from resonating to the remaining components of the instruments, whereby these instruments are improved in reliability;

(4) The spacer 7 may be fabricated by a bearing maker so as to align with the ball bearing unit 5 and the outer race ring 3 with high accuracy. Further, the spacer 7 has its small-diameter portion 7a and 7b fitted in the outer race rings 3 and 5b, respectively. In other words, these components 7, 4, 5b are firmly united. As a result, the spacer 7 may be coaxially arranged with the stepped-diameter shaft 1 with high accuracy, which enables the bearing assembly of the present invention to considerably reduce the vibration and noise thereof; and (5) The number of the conventional ball bearing units used in the bearing assembly of the present invention is only one which is the ball bearing unit 5. Consequently, the bearing assembly of the present invention uses only one inner race ring 5a, and is therefore small in the number of its components in comparison with the conventional bearing assemblies.

What is claimed is:

1. A bearing assembly comprising:

a stepped-diameter shaft provided with a large-diameter portion, a small-diameter portion and an annular inner raceway groove directly formed in an outer peripheral surface of said large-diameter portion;

a first outer race ring coaxially disposed around said large-diameter portion of said stepped-diameter shaft and spaced apart therefrom to form an annular space therebetween, said first outer race ring having its inner peripheral surface formed into an outer raceway groove;

a plurality of first balls rotatably mounted in said annular space defined between said annular inner raceway groove of said stepped-diameter shaft and said annular outer raceway groove of said first outer race ring; and a sleeve-like spacer which is provided with a pair of small-diameter portions in its opposite axial end portions and has one of its small-diameter portions fitted in said first outer race ring and the other fitted in a second outer race of a ball bearing unit which has its inner race ring mounted on said small-diameter portion of said stepped-diameter shaft, said sleeve-like spacer being coaxially disposed around said stepped-diameter shaft while spaced apart therefrom and axially extending between said first outer race and said second outer race of said ball bearing unit which is provided with a plurality of second balls between said inner race ring and said second outer race ring;

whereby said first outer race ring, said sleeve-like spacer, said plurality of first balls, said ball bearing unit and said stepped-diameter shaft are assembled into a bearing assembly.

2. The bearing assembly as set forth in claim 1, wherein:

an outer diameter of said inner race ring of said ball bearing unit is the same as that of said large-diameter portion of said stepped-diameter shaft; and an outer and an inner diameter of said second outer race ring of said ball bearing unit are the same as those of said first outer race ring, respectively;

whereby said first and said second balls are the same in diameter.

3. The bearing assembly as set forth in claim 1, wherein:

said bearing assembly further comprises a ball retainer coaxially and rotatably mounted in said annular space to rotatably retain said first balls therein.

4. A method of manufacturing a bearing assembly, comprising the steps of:

forming an annular inner raceway groove directly in an outer peripheral surface of a large-diameter portion of a stepped-diameter shaft provided with a small-diameter portion;

mounting a plurality of first balls in an annular space defined between said annular inner raceway groove of said stepped-diameter shaft and an annular outer raceway groove formed in an inner peripheral surface of a first outer race ring which is coaxially disposed around said large-diameter portion of said stepped-diameter shaft so as to be oppositely disposed from said annular inner raceway groove of said stepped-diameter shaft;

coaxially mounting a sleeve-like spacer around said stepped-diameter shaft so as to be spaced apart therefrom, said spacer being provided with a pair of small-diameter portions in its axial end portions and having one of its small-diameter portions coaxially fitted in said first outer race ring;

slidably mounting the other of said small-diameter portions of said spacer in a second outer race ring of a ball bearing unit provided with a plurality of second balls and an inner race ring, said ball bearing unit having its inner race ring slidably mounted on said small-diameter portion of said stepped-diameter shaft; and bonding said inner race ring of said ball bearing unit to said small-diameter portion of said stepped-diameter shaft by means of an adhesive and like connecting means in a condition in which a predetermined axially inward pre-load is applied to an outer end surface of said inner race ring or said second outer race ring of said ball bearing unit;

whereby said first outer race ring, said sleeve-like spacer, said plurality of first balls, said ball bearing unit and said stepped-diameter shaft are assembled into a bearing assembly.

* * * * *